No. 778,296. PATENTED DEC. 27, 1904.
G. P. WRIGLEY.
AUTOMATIC FLASH PAN.
APPLICATION FILED OCT. 13, 1904.

2 SHEETS—SHEET 1.

Witnesses
Inventor
Garnet P. Wrigley
By James Hamilton
Attorney

No. 778,296. PATENTED DEC. 27, 1904.
G. P. WRIGLEY.
AUTOMATIC FLASH PAN.
APPLICATION FILED OCT. 13, 1904.
2 SHEETS—SHEET 2.
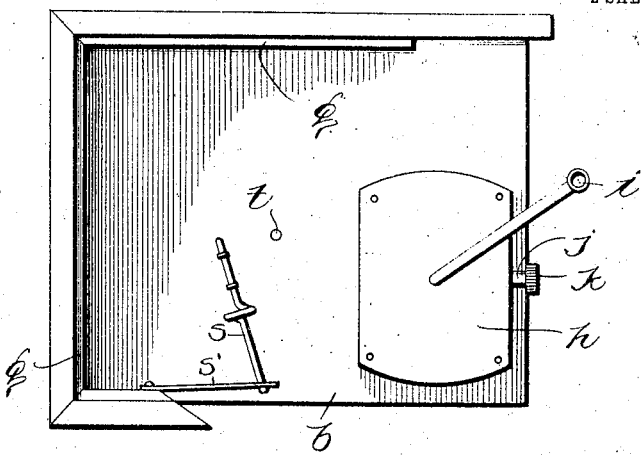
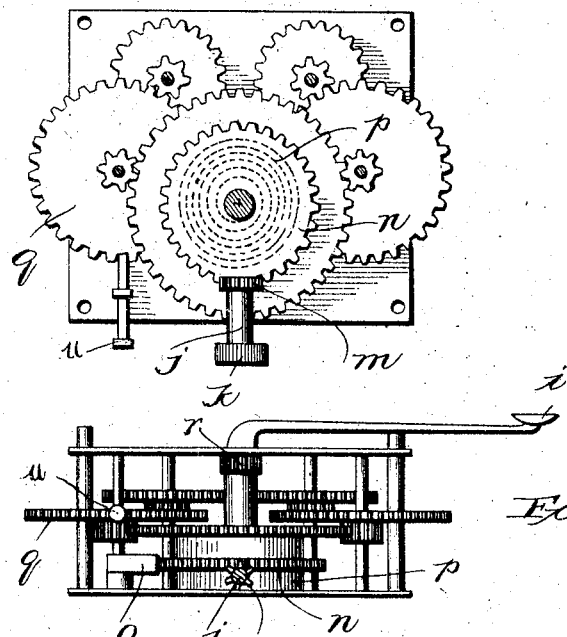
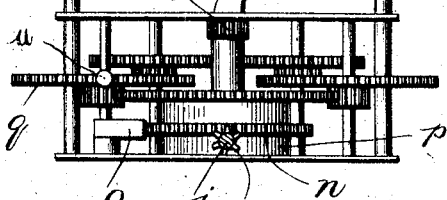
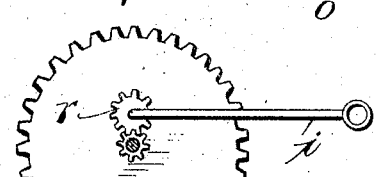
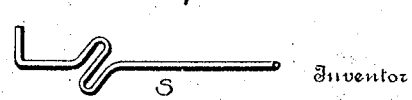

No. 778,296. Patented December 27, 1904.

UNITED STATES PATENT OFFICE.

GARNET P. WRIGLEY, OF ELMIRA, NEW YORK.

AUTOMATIC FLASH-PAN.

SPECIFICATION forming part of Letters Patent No. 778,296, dated December 27, 1904.

Application filed October 13, 1904. Serial No. 228,279.

*To all whom it may concern:*

Be it known that I, GARNET P. WRIGLEY, a citizen of the United States, and a resident of Elmira, in the county of Chemung and State of New York, have invented a new and useful Improvement in Automatic Flash-Pans, of which the following is a specification, reference being had to the accompanying drawings.

My invention relates to flash-pans used in flash-light photography; and the object of my invention is to provide a device of this class which shall be certain in its action, free from danger in its operation, cheap and compact in its construction, and controllable by the operator of the camera in the taking of the picture.

Figure 1:
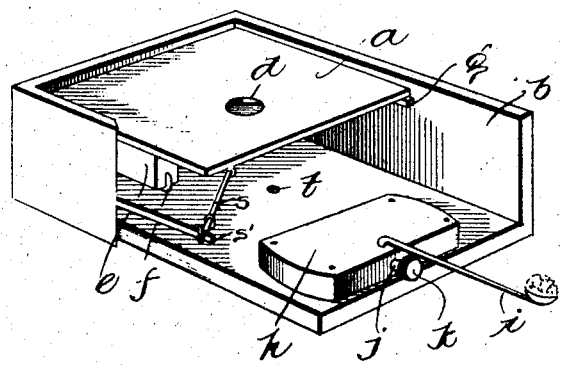
Figure 2:
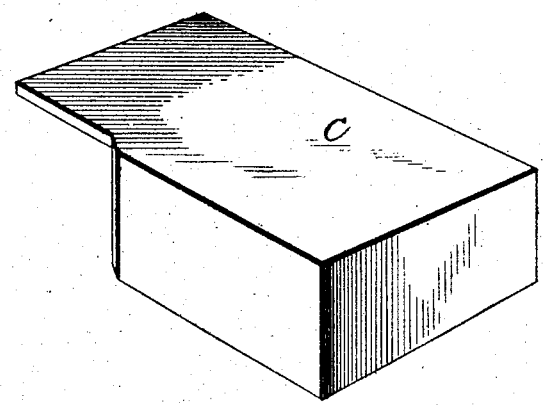
Figure 3:
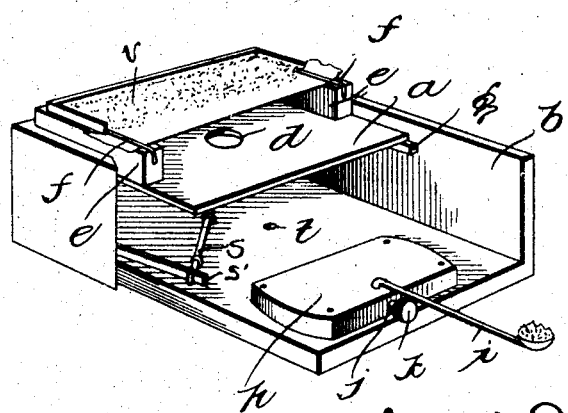

In the drawings illustrating the principle of my invention and the best mode now known to me of applying that principle, Figure 1 is a perspective view of my new device, the cover having been removed. Fig. 2 shows the cover. Fig. 3 illustrates the device in perspective as it looks when set up ready for action. Fig. 4 is a plan view showing the pan removed. Fig. 5 is a bottom plan view of the intermeshing toothed mechanism, the casing being shown removed to permit clearness of illustration. Fig. 6 shows the intermeshing toothed mechanism in elevation. Fig. 7 is a detail showing the mechanism which drives the fire-carrier or torch, and Fig. 8 is a detail of the catch for the fire-carrier or torch.

In Fig. 1 the pan $a$ is shown bottom side up to give compactness to the structure, while in Fig. 3 the pan $a$ is turned right side up—its position when the device is to be used. The device is supported by the box $b$ and is designed to be protected by the cover $c$, Fig. 2. The pan $a$ is formed with a hole $d$ for the passage of the flame to the powder and is provided with blocks $e$ $e$, upon which are mounted the wire paper-holders $f$ $f$. The pan $a$ is supported in the box $b$ upon the cleats or lugs $g$.

The casing $h$ covers the intermeshing toothed mechanism which drives the fire-carrier or torch $i$. In the casing $h$ is mounted the winder $j$, at the outer end of which is formed the milled head $k$ and at the inner end of which is provided a pinion $m$, which engages the teeth of the gear-wheel $n$, which is provided with a click $o$, fastened to the lower plate of the casing, as shown in Fig. 6. By turning the winder $j$ to the right the spring $p$ is wound up, as will be readily understood from the drawings without further description. Slidably mounted in the casing $h$ is a stop-key $u$, adapted to engage the teeth of the gear-wheel $q$ in mesh with the train of gearing shown in Figs. 5 and 6. This stop-key serves to control the motion of the train of gearing under the influence of the tension of the spring $p$. The torch $i$ is driven from the shaft of the gear-wheel $r$, Fig. 7, and is stopped directly under the hole $d$ by a catch $s$, controlled by a flat spring $s'$, which is shown in detail in Fig. 8 and in position in Fig. 3.

In case it be desired to mount the flash-pan upon a tripod an aperture $t$ is provided for the attachment of a tripod.

The operation of the device will now be easily understood: The winder $j$ is first turned to the right to give the required tension to the spring, which is preferably strong enough to carry the torch $i$ to its igniting position under the hole $d$ in about fifteen seconds. The train of gearing is held against rotation by the stop-key $u$. The torch $i$ carries at its free end a small sponge which is soaked with some inflammable liquid, as alcohol. The torch $i$ is detachable to permit the soaking of the sponge in the alcohol, and after being so moistened the torch is replaced. The pan $a$ is placed in the position shown in Fig. 3, and a strip of paper about half an inch wide and three inches long is placed under the wire paper-holders $f$ $f$ in such a position that the paper projects about three-eighths of an inch over the hole $d$. Powder is now poured over the paper to its edge and also over the table portion $v$ of the pan $a$. The powder may be poured in a pile; but it is recommended that it be sprinkled, as this method produces the best results. The sponge of the torch $i$ is now moistened, as above described. The device may now be placed in any desired position—above or below the camera or in any other convenient position. The torch $i$ is ignited, and the stop-key $u$ is withdrawn to permit the rotation of the train of gearing under the influence of the tension of the spring $p$ and the consequent driving of the torch $i$ around until it is stopped by the catch $s$ directly under the hole $d$, through which the flame from the torch now passes, igniting the paper strip and then the powder, thereby producing the flash desired. After the flash has been made the torch $i$ is released by pressing the catch $s$ toward the torch $i$, and after the release of the torch the catch $s$ is restored to its original position. The rotation of the torch is stopped by pushing in the stop-key $u$.

The time that intervenes between the pulling of the stop-key $u$ and the ignition of the powder may be varied by varying the initial position of the torch, as by placing it to the left of the winder $j$ instead of to the right of that member.

What I claim is—

1. In a flash-pan, the combination of means for holding the powder; a rotary torch adjustable in position to vary its time of travel to said means; and means for driving said torch around to its igniting position.

2. In a flash-pan, the combination of means for holding the powder; a rotary torch; means for rotating said torch to igniting position; and a catch adapted to stop said torch in its igniting position, and to be released to permit the further rotation of the torch in the same direction after the flash.

3. In a flash-pan, the combination of means for holding the powder; a rotary torch; means for rotating said torch to igniting position; and a device for stopping said rotating means in any desired position.

4. In a flash-pan, the combination of means for holding the powder; a rotary torch; means for rotating said torch to igniting position; a spring-controlled releasable device for automatically stopping said torch in its igniting position; and a device for controlling said rotating means.

5. In a flash-pan, the combination of a pan formed with a hole to allow the passage of flame; strip-holding devices mounted thereon; a rotary torch; and means for rotating the torch into position beneath said hole.

6. In a flash-pan, the combination of a box; a pan formed with a hole for the passage of flame and reversibly mounted in said box; strip-holding devices mounted in said pan; a rotary torch; and means for rotating said torch into position beneath said hole.

7. In a flash-pan, the combination of a box; a cover therefor; a reversible pan mounted therein; strip-holding devices mounted on said pan; a rotary torch; and means for rotating said torch to its igniting position.

Dated at said Elmira this 30th day of September, A. D. 1904.

GARNET P. WRIGLEY.

Witnesses:
JOHN I. MURTAUGH,
JAMES J. O'CONNOR.